(12) United States Patent
Pan et al.

(10) Patent No.: US 6,589,609 B1
(45) Date of Patent: Jul. 8, 2003

(54) CRYSTAL ZONE TEXTURE OF GLASS-CERAMIC SUBSTRATES FOR MAGNETIC RECORDING DISKS

(75) Inventors: Zhengda Pan, Newark, CA (US); Jialuo Jack Xuan, Milpitas, CA (US); Chung Y. Shih, Cupertino, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/577,676

(22) Filed: May 25, 2000

Related U.S. Application Data

(60) Provisional application No. 60/144,279, filed on Jul. 15, 1999.

(51) Int. Cl.[7] ................................................. G11B 5/82
(52) U.S. Cl. ..................... 427/554; 427/555; 427/129; 427/596; 428/694 SG
(58) Field of Search ............................. 427/554, 555, 427/129, 596; 428/694 SG

(56) References Cited

U.S. PATENT DOCUMENTS

| | | | |
|---|---|---|---|
| 5,352,495 A | * 10/1994 | Henderson et al. | ......... 427/596 |
| 5,714,207 A | 2/1998 | Kuo | ............................ 427/555 |
| 5,853,820 A | 12/1998 | Kuo et al. | .................... 427/555 |
| 5,955,154 A | 9/1999 | Xuan et al. | .................. 427/555 |
| 6,048,588 A | * 4/2000 | Engelsberg | ................. 427/554 |
| 6,068,891 A | * 5/2000 | O'Dell et al. | ................ 427/555 |
| 6,086,977 A | * 7/2000 | Suzuki et al. | ................ 428/141 |
| 6,277,465 B1 | * 8/2001 | Watanabe et al. | ........... 428/141 |

* cited by examiner

Primary Examiner—Steven A. Resan
(74) Attorney, Agent, or Firm—McDermott, Will & Emery

(57) ABSTRACT

A glass-ceramic substrate for magnetic recording media is textured employing a continuous wave laser light beam to uniformly heat a surface zone, thereby forming a continuously roughened zone defined by recrystallized microcrystals. Embodiments include impinging a continuous wave $CO_2$ laser light beam on a rotating glass-ceramic substrate to uniformly heat an annular zone at a temperature between the crystallization temperature and melting point of the glass-ceramic substrate followed by air cooling to induce a continuous surface roughness having an Ra of about 5 Å to about 20 Å, thereby enabling a glide height of about 0.2 to 0.5 $\mu$ in.

12 Claims, 4 Drawing Sheets

CRYSTAL ZONE TEXTURE OF GLASS-CERAMIC SUBSTRATES FOR MAGNETIC RECORDING DISKS

RELATED APPLICATION

This application claims priority from provisional patent application Ser. No. 60/144,279 filed on Jul. 15, 1999, entitled "CRYSTAL ZONE TEXTURE OF GLASS-CERAMIC SUBSTRATES FOR MAGNETIC RECORDING DISKS", the entire disclosure of which is hereby incorporated by referenced herein.

TECHNICAL FIELD

The present invention relates to the recording, storage and reading of magnetic data, particularly rotatable magnetic recording media, such as thin film magnetic disks having textured surfaces for contact with cooperating magnetic transducer heads. The invention has particular applicability to high areal density magnetic recording media designed for drive programs having a reduced flying height and improve shock resistance for mobile computer data storage applications.

BACKGROUND ART

Thin film magnetic recording disks and disk drives are conventionally employed for storing large amounts of data in magnetizable form. Typically, one or more disks are rotated on a central axis in combination with data transducer heads. In operation, a typical contact start/stop (CSS) method commences when the head begins to slide against the surface of the disk as the disk begins to rotate. Upon reaching a predetermined high rotational speed, the head floats in air at a predetermined distance from the surface of the disk due to dynamic pressure effects caused by air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions allowing data to be recorded on and retrieved from the surface of the disk at a desired position. Upon terminating operation of the disk drive, the rotational speed of the disk decreases and the head again begins to slide against the surface of the disk and eventually stops in contact with and pressing against a landing zone of the disk. Thus, the transducer head contacts the recording surface whenever the disk is stationary, accelerated from the stop and during deceleration just prior to completely stopping. Each time the head and disk assembly is driven, the sliding surface of the head repeats the cyclic operation consisting of stopping, sliding against the surface of the disk, floating in the air, sliding against the surface of the disk landing zone and stopping.

It is considered desirable during reading and recording operations to maintain each transducer head as close to its associated recording surface as possible, i.e., to minimize the flying height of the head. Thus, a smooth recording surface is preferred, as well as a smooth opposing surface of the associated transducer head, thereby permitting the head and the disk to be positioned in close proximity with an attendant increase in predictability and consistent behavior of the air bearing supporting the head. However, if the head surface and the recording surface are too flat, the precision match of these surfaces gives rise to excessive stiction and friction during the start up and stopping phases, thereby causing wear to the head and recording surfaces eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques involve polishing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers.

The escalating requirements for high areal recording density impose increasingly greater requirements on thin film magnetic media in terms of coercivity, stiction squareness, low medium noise and narrow track recording performance. In addition, increasingly high density and large-capacity magnetic disks require increasingly smaller flying heights, i.e., the distance by which the head floats above the surface of the disk in the CSS drive. The requirement to further reduce the flying height of the head renders it particularly difficult to satisfy the requirements for controlled texturing to avoid head crash.

Conventional laser texturing techniques have previously been applied to metal-containing substrates or substrates having a metal-containing surface, such as Ni—P plated Al or Al-base alloys. Such substrates, however, exhibit a tendency toward corrosion and are relatively fragile, thereby limiting their utility so that they are not particularly desirable for use in mobile computer data storage applications, such as laptop computers. Glasses and glass-ceramics, i.e., two-phase materials comprising an amorphous glass phase and a crystalline ceramic phase, exhibit superior "hardness", resistance to shock, heat resistance and chemical stability (acid and alkali resistance) than Ni—P plated Al or Al-alloy substrates. Accordingly, glass and glass-ceramic substrates are capable of being polished to a greater smoothness than Ni—P plated Al or Al-alloy substrates for high areal density ultra-low flying height application and provide better shock resistance for use in mobile computer data storage application. However, it is extremely difficult to provide an adequate texture on a glass or a glass-ceramic substrate, particularly in view of the escalating requirements for high areal recording density.

Conventional practices for texturing a glass or glass-ceramic substrate comprise heat treatment during which the crystallization temperature is maintained for about 1 to about 5 hours to generate secondary crystal grains forming the surface texture characterized by irregular protrusions with surrounding valleys extending into substrate.

The use of heat treatment to form a textured surface on alternate substrates, such as glass or glass-ceramic substrates, is undesirably slow and inefficient in terms of energy consumption. Significantly, it is extremely difficult to exercise control over the size and shape of the secondary crystal grains due to inherent limitations in controlling temperature uniformity. Accordingly it is virtually impossible to provide a glass or glass-ceramic substrate with a controlled textured landing zone for optimizing flying height and maximizing data zone recording density. Moreover, the resulting texture comprises irregularly shaped protrusions with surrounding valleys extending into the substrate, thereby creating undesirable stress profiles during subsequent deposition of layers by sputtering at elevated temperatures. Such undesirable stress, profiles render it extremely difficult to accurately replicate the texture in subsequently deposited layers. It is also difficult to optimize both the bulk and surface properties at the same time because the entire substrate is heated. In addition, it is not possible to provide a glass-ceramic substrate with a controlled textured landing zone together with a super-smooth data zone to maximize recording density.

Pulsed laser light beams have also been employed to laser texture substrates, such as glass-ceramic substrates. Kuo et al. in U.S. Pat. No. 5,853,820 disclose a method of manufacturing a magnetic recording medium comprising texturing a surface of a glass-ceramic substrate with a pulsed, focused laser light beam to form a plurality of protrusions, wherein the crystalline phase of the glass-ceramic substrate is less than about 70% by volume. Kuo in U.S. Pat. No. 5,714,207 discloses a method of manufacturing a magnetic recording medium comprising texturing a surface of a glass or glass-ceramic substrate with a pulsed, focused laser light beam to form a plurality of protrusions and controlling the height of the protrusions by controlling the quench rate during resolidification of the laser formed protrusions. Xuan in U.S. Pat. No. 5,955,154 discloses a method of manufacturing a magnetic recording medium by comprising laser texturing an upper surface of a glass-ceramic substrate with a pulsed, focused laser light beam to form a textured upper surface by localized crystallization.

Such techniques for laser texturing glass or glass-ceramic substrates employ a pulsed focused laser light beam, typically at a wavelength of about 10.6 gm from a carbon dioxide ($CO_2$) laser source. The textured glass or glass-ceramic substrate comprises a two-dimensional array of discrete dome-shaped bumps or protrusions extending about the substrate surface. The laser textured landing zone provides a head-bump-interface to alleviate the head-disk stiction. The bump height is controlled by adjusting the laser pulse width and laser power. Typically, the bump height extends above 50 Å and the glide-avalange value is at least 0.3 $\mu$-inch greater than that on untextured surfaces.

There are disadvantages attendant upon laser texturing a glass-ceramic substrate employing a pulsed focused laser light beam. Specifically, the texture comprises discrete dome shaped protrusions having a height no less than about 50 Å. A large heating gradient is required which causes stress around the bumps. It is also difficult to achieve a high bump density. In addition, lithium ion migration causes corrosion. Moreover, the laser power utility is undesirable.

For tribological purposes, i.e., ultra-low glide, low stiction and low wear rate at the head-media-interface, a continuous textured landing zone with a controllable surface roughness is required. Accordingly, there exists a need for magnetic recording media and methodology for manufacturing magnetic recording media comprising a glass-ceramic substrate having a continuous textured landing zone with controllable roughness and a low flying height.

DISCLOSURE OF THE INVENTION

An object of the present invention is a method of manufacturing a magnetic recording medium comprising a glass-ceramic substrate having a continuous textured landing zone with controllable roughness and a low flying height.

Another object of the present invention is a magnetic recording medium comprising a glass-ceramic substrate having a continuous textured landing zone with a low flying height.

Additional objects, advantages and other features of the present invention will be set forth in the description which follows and in part will become apparent to those having ordinary skill in the are upon examination of the following or may be learned from the practice of the present invention. The objects and advantages of the present invention may be realized and obtained as particularly pointed out in the appended claims.

According to the present invention, the foregoing and other objects are achieved in part by a method of manufacturing a magnetic recording medium, the method comprising substantially uniformly heating a zone on a surface glass-ceramic substrate with a continuous wave laser light beam to increase surface roughness.

Another aspect of the present invention is a magnetic recording medium comprising a glass-ceramic substrate having an annular landing zone defined by a substantially uniform roughness comprising recrystallized microcrystals.

Embodiments of the present invention comprise impinging a shaped continuous wave rectangular laser light beam having a flat top intensity profile on a rotating glass-ceramic substrate to substantially uniformly heat an annular zone and air cooling to induce surface roughness comprising crystallized microcrystals, the annular zone comprising a landing zone having an average surface roughness (Ra) of about 6 Å to about 30 Å, e.g., about 5 Å to about 20 Å, and an average roughness peak (Rp) of about 20 Å to about 120 Å. Advantageously, magnetic recording media in accordance with embodiments of the present invention are capable of being employed with a transducer head at a glide height less than about 3 $\mu$-in., e.g., about 0.2 to about 0.5 $\mu$-in.

Additional objects and advantages of the present invention will become readily apparent to those skilled in the art from the following detailed description, wherein embodiments of the present invention are described, simply by way of illustration of the best mode contemplated for carrying out the present invention. As will be realized, the present invention is capable of other and different embodiments, and its several details are capable of modifications in various obvious respects, all without departing from the present invention. Accordingly, the drawings and description are to be regarded as illustrative in nature, and not as restrictive.

BRIEF DESCRIPTION OF THE DRAWINGS

In FIGS. 4 through 7, similar elements and parameters are represented by similar reference numerals.

DESCRIPTION OF THE INVENTION

Figure 1B:
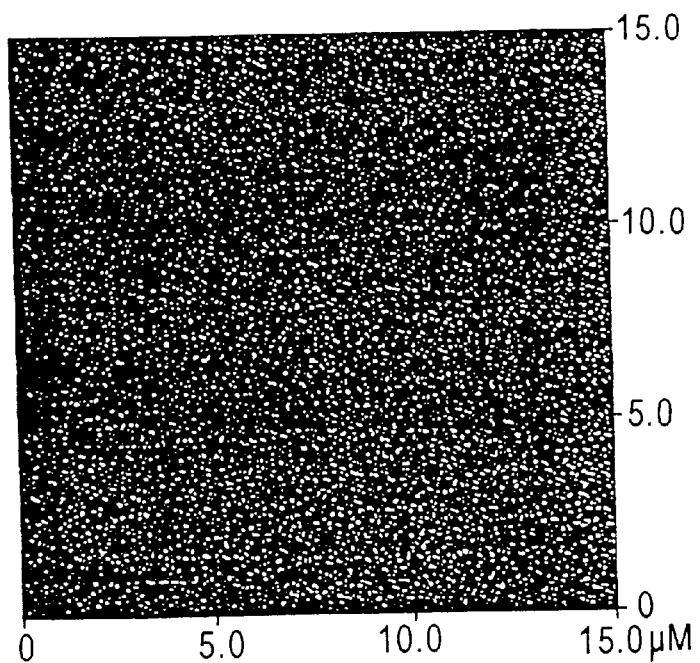
FIG. 1B is a top view of the substrate of FIG. 1A.

The present invention addresses and overcomes disadvantages attendant upon conventional laser texturing and heat treatment texturing of glass-ceramic substrates. For example, conventional heat treatment techniques are undesirable slow, and it is extremely difficult if not impossible to selectively optimize bulk and surface properties. Conventional heat treatment are incapable of selectively forming a particular textured zone, such as a landing zone together with a super-smooth data zone, to maximize recording density. Conventional laser texturing techniques employ a pulsed focus laser light beam and can not form a continuous textured landing zone with a controllable roughness. Rather, conventional laser texturing techniques form discrete dome shaped bump having a bumps height in excess of 50 Å with limited bump density and a large heating gradient causing stress around the bumps.

The present invention addresses and solves such problems attendant upon conventional techniques for texturing a glass-ceramic substrate by providing an efficient method for forming a continuous laser textured landing zone on a surface of a glass-ceramic substrate with controllable roughness, e.g., an average surface roughness (Ra) of about 6 Å to about 30 Å, e.g., a Ra of about 5 Å to about 20 Å. This objective is achieved by heating a zone, e.g., an annular zone, on a surface of a glass-ceramic substrate with a continuous wave laser light beam, e.g., a continuous wave laser light beam derived from a $CO_2$ source. Embodiments of the present invention comprise heating the annular zone to a temperature between the crystallization temperature and the melting temperature of the glass-ceramic substrate using a shaped laser light beam which uniformly heats a specified zone. The zone, which will ultimately serve as the textured landing zone, is recrystallized to form microcrystals on the surface. Advantageously, the size of the microcrystals can be tailored by controlling heating energy and time during exposure to the continuous wave laser light beam.

In accordance with embodiments of the present invention, beam-shaping optics are employed to convert a continuous wave $CO_2$ laser light beam having a Gaussian profile to a rectangular beam with a flat-top intensity profile. A super-polished glass-ceramic substrate is rotated while the laser light beam is projected on the disk surface to uniformly heat a ring area or annular area on the disk surface. By controlling the disk rotating speed and laser intensity, the ring area of the disk surface is heated to a temperature between the crystallization temperature and the melting temperature. At a temperature above the crystallization temperature, the crystal phases change and then recrystallize during air cooling. These reformed microcrystals increase the roughness of the surface, thereby creating a crystal textured landing zone. For example, when heating an O'Hara lithium disilicate glass-ceramic substrate, the ring or annular area of the glass-ceramic can be heated to a temperature of about 800° C. to about 900° C.

The present invention employing a shaped continuous wave laser light beam produces a continuous textured landing zone with a controllable roughness. Advantageously, an Ra of about 5 Å to about 20 Å can be obtained for ultra-low flying height application and low wear rate. Laser beam-shaping provides uniform heating, thereby reducing surface stress as well as corrosion. Embodiments of the present invention can be implemented with high efficiency requiring only a few seconds per disk with a laser power of 100 watts. Unlike conventional techniques employing a pulsed focused laser light beam, the use of a continuous wave laser light beam in accordance with embodiments of the present invention produces a substantially uniform and continuous texture vis-à-vis a two-dimensional array of discrete dome-shape bumps above the substrate surface. The heated surface zone in accordance with the present invention is recrystallized to form microcrystals on the surface vis-à-vis isolated bumps.

Conventional laser bumps have a diameter of about 5 microns to about 15 microns and a bump height of about 50 Å to about 200 Å. In accordance with embodiments of the present invention, a textured annular landing zone is formed with a substantially uniform surface roughness, an Ra of about 5 Å to about 20 Å and an Rp of about 20 Å to about 120 Å.

Conventional laser textured glass-ceramic substrates are limited in glide height to a distance of about 100 Å to about 200 Å because of the inability to form uniform protrusions having a bump height less than about 50 Å. Thus, conventional magnetic recording media are confined to a glide height of about 0.6 $\mu$-in. In accordance with embodiments of the present invention, a glide height of about 0.03 $\mu$-in and under is achieved, e.g., about 0.2 to about 0.5 $\mu$-in, by forming an annular landing zone having a substantially uniform surface roughness comprising crystallized microcrystals with an Ra of about 5 Å to about 20 Å.

Figure 4:
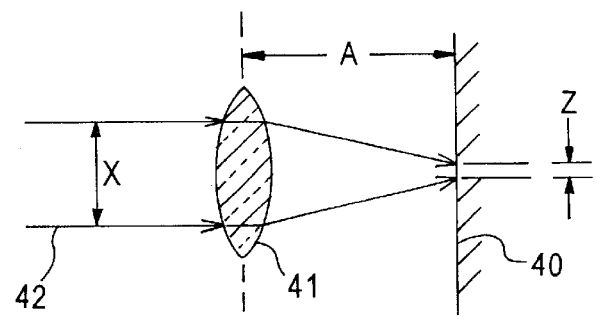
FIG. 4 illustrates a conventional laser texturing technique.

In accordance with embodiments of the present invention, a continuous wave $CO_2$ laser light beam is optically shaped to a rectangular beam with a flat-top density profile. The surface of the glass-ceramic substrate is heated with the shaped laser light beam such that the diameter of the spot size impinging on the surface of the substrate is significantly greater than conventional practices employing a pulsed focused laser light beam, as by employing a laser light beam in the negative or positive defocus ranges. For example, the spot size of a laser light beam can be represented by the following formula:

$$\emptyset_d = \frac{4}{\pi} \cdot \frac{FL}{\emptyset_D} \cdot \lambda$$

wherein:
$\lambda$=10.6 $\mu$m ($CO_2$ laser);
FL=focal length;
$\emptyset_d$=diameter of spot size on surface; and
$\emptyset_D$=incoming laser beam diameter Adverting to FIG. 4, a conventional laser texturing technique is disclosed for texturing a glass-ceramic substrate 40 by impinging pulsed, laser light beam 42 through lens 41. As shown in FIG. 4, the incoming pulsed laser light beam 42 has a $\emptyset_D$ of 16.8 mm, while lens 41 is positioned at a FL of 20 mm. The spot size z on the surface ($\emptyset_d$) is 16 microns. The substrate 40 can also be a glass substrate.

Figure 5:
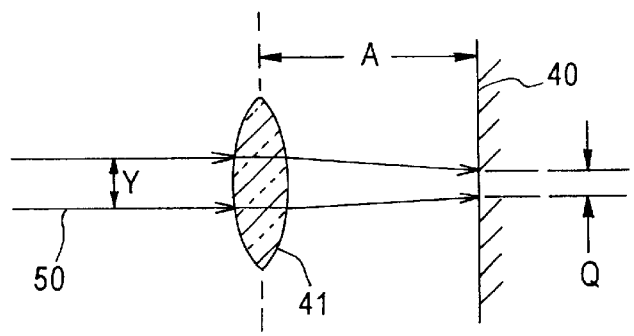
FIGS. 5–7 illustrate laser heating in accordance with embodiments of the present invention.

FIGS. 4 through 7 represent embodiments of the present invention wherein a defocused continuous wave laser light beam is employed to heat a glass-ceramic substrate to roughen the surface to form a uniformly textured annular landing zone. As shown in FIG. 5, the continuous wave laser light beam has a $\emptyset_D$, represented by reference letter Y, of 6.3 microns and positioned at a FL of 20 mm. However, the $\emptyset_d$ (spot size) on the surface of substrate 40, represented by reference letter Q, is 43 microns, considerable larger than the 16 microns $\emptyset_d$ of the conventional practice illustrated in FIG. 4. The embodiment illustrated in FIG. 5 employs a laser light beam having a smaller beam diameter $\emptyset_D$ to defocus the beam.

Figure 6:
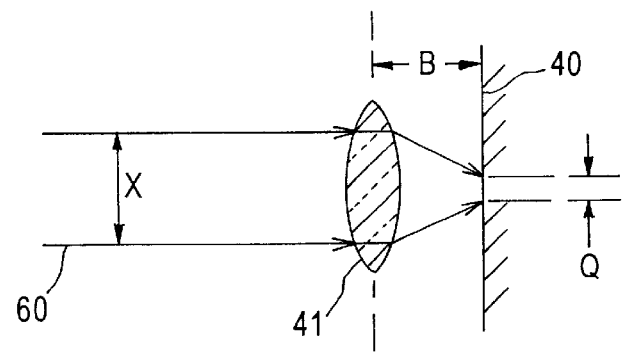

In accordance with another embodiment of the present invention, as illustrated in FIG. 6, the lens is shifted closer to the substrate to defocus the beam. As shown in FIG. 6, incoming laser light beam 60 has a $\emptyset_D$ of 16.8 mm and a FL of 19.95 indicated by reference letter B. The resulting $\emptyset_d$ spot size diameter on substrate 40 surface, indicated by reference letter Q, is 43 microns, considerable larger than the $\emptyset_d$ value of 16 microns in the conventional pulsed laser light beam technique illustrated in FIG. 4.

Figure 7:
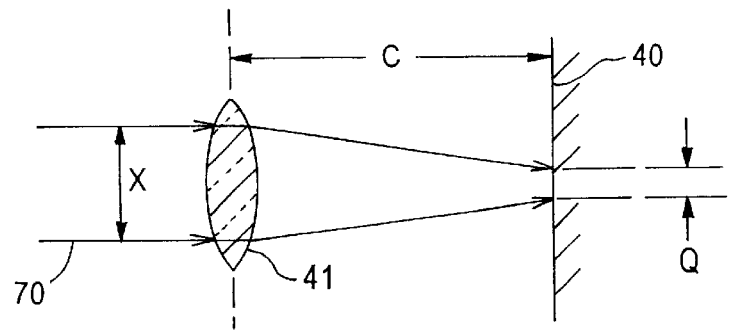

In accordance with another embodiment of the present invention, a continuous laser light beam is defocused by shifting the lens away from the substrate surface. As shown in FIG. 7, lens 41 is positioned at a FL of 20.05 mm indicated by reference letter C. The incoming continuous wave laser light beam 70 has a $\varnothing_D$ diameter of 16.8 mm indicated by reference letter X. The resulting $\varnothing_d$ spot size diameter on substrate 40 is, indicated by reference letter Q, is significantly greater than the $\varnothing_d$ value of 16, indicated by reference letter Z, formed by the conventional pulsed laser light beam texturing technique illustrated in FIG. 4.

Given the above noted formula, the optimum value for $\varnothing_d$ can be determined in a particular situation. For example, it was found suitable to heat a glass-ceramic substrate with a defocused continuous wave laser light beam to form a spot size having a diameter of about 40 microns to about 50 microns.

EXAMPLE

An O'Hara lithium disilicate glass-ceramic substrate was heated with a continuous wave laser light beam a laser power of about 5 W and a spot size of about 2,000 mm while the substrate was rotated at a disk linear velocity of 100 cm/sec. The resulting laser textured zone exhibited an Ra of 12 Å and Rp of 34 Å. Advantageously, the surface texture roughness can be increased by increasing the laser power or decreasing the disk linear velocity.

An O'Hara super-smooth glass-ceramic substrate having a Ra of 2.5 Å was subjected to laser heating in accordance with an embodiment of the present invention. FIG. 1A is an AMF image of the O'Hara glass-ceramic substrate, while FIG. 1B is a top view of the substrate shown in FIG. 1A.

Figure 1A:
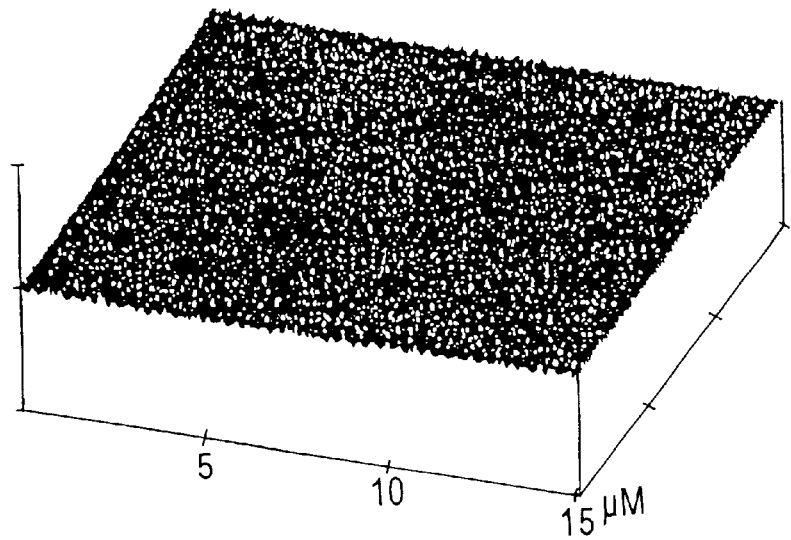
FIG. 1A is an atomic force microscope (AFM) image of a supper smooth glass-ceramic substrate.
Figure 2B:
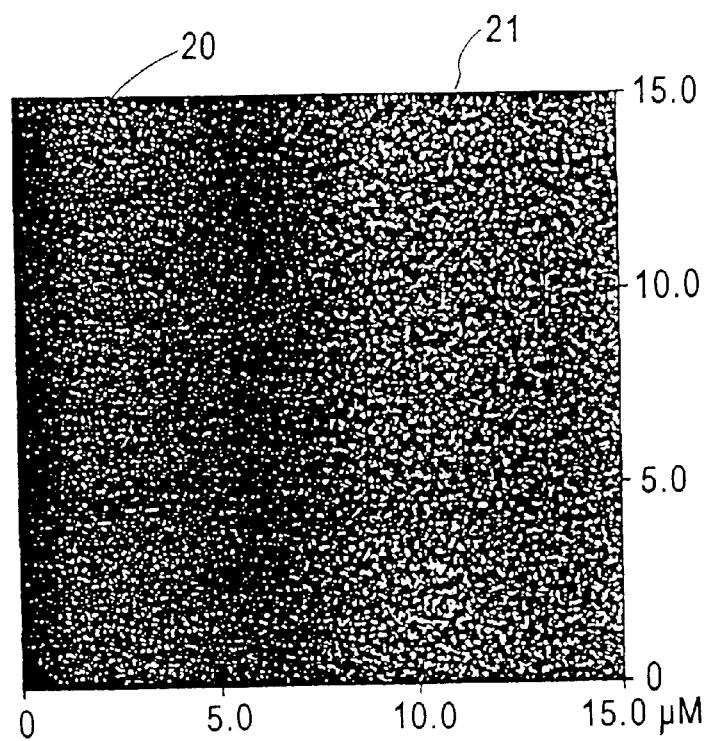
FIG. 2B is a top view of the substrate of FIG. 2A.
Figure 2A:
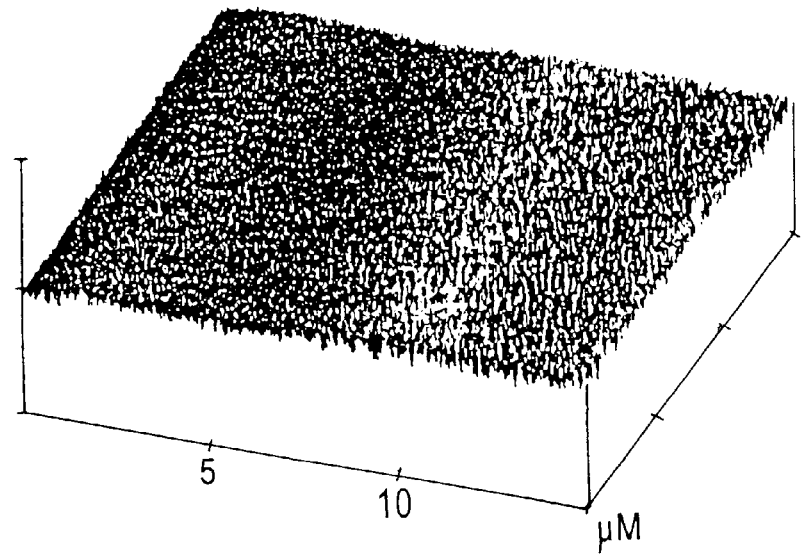
FIG. 2A is an AFM image of the substrate of FIG. 1A having the right hand portion of the surface textured in accordance with the present invention.

The right hand side of the glass-ceramic substrate illustrated in FIGS. 1A and 1B was heated using a continuous wave laser light beam in accordance with an embodiment of the present invention to increase the surface roughness. An AMF image of the substrate of FIG. 1A so treated is illustrated in FIG. 2A, while FIG. 2B is a top view of the treated substrate. Adverting to FIG. 2A, the left hand side 20, which is untextured, had an Ra of 2.5 Å, while the right hand side 21, heated for increasing the surface roughness in accordance with the present invention, exhibited a Ra of 7 Å.

Figure 3B:
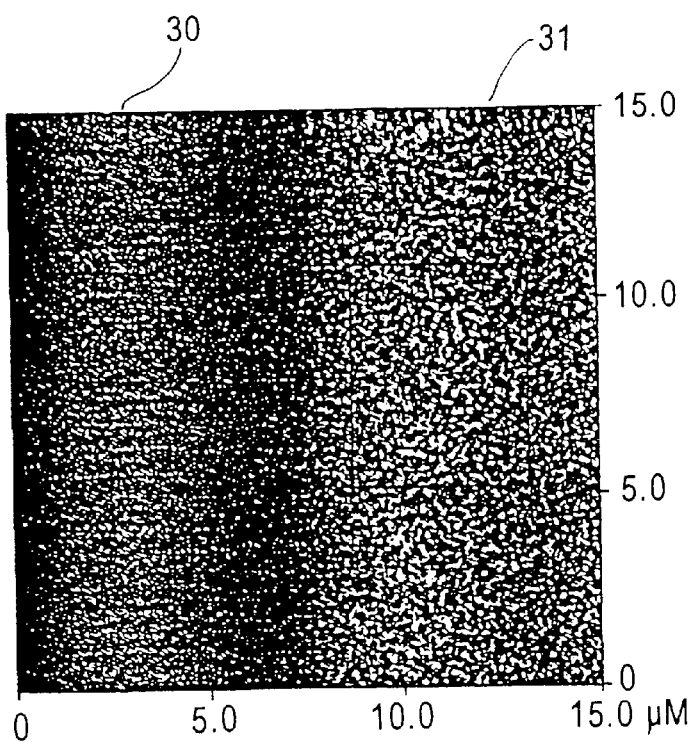
FIG. 3B is the top view of the substrate of FIG. 3A.
Figure 3A:
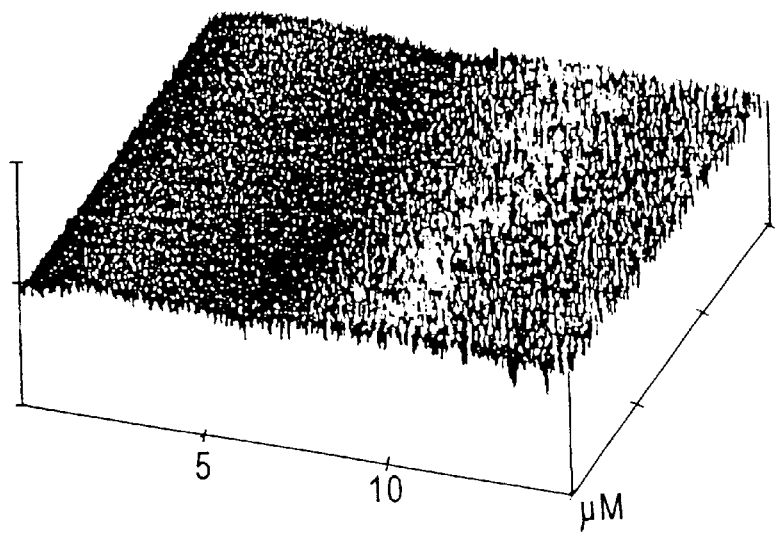
FIG. 3A is an AFM image of the substrate of FIG. 1A having the right hand portion of the surface textured in accordance with the embodiment of the present invention.

The right hand side of another substrate as shown in FIGS. 1A and 1B was subjected to heating with a continuous wave laser light beam in accordance with an embodiment of the present invention. An AMF image of the so heated substrate is shown in FIG. 3A, while FIG. 3B is a top view of the substrate of FIG. 3A. As shown in FIG. 3B, the left hand side 30 which was untextured exhibited an Ra of 2.5 Å, while the right hand side 31, heated in accordance with an embodiment of the present invention to increase the surface roughness, had an Ra of 10 Å.

In accordance with embodiments of the present invention, the surface of a glass-ceramic substrate is provided with a continuous texture having a controllable roughness, e.g., an Ra of about 5 Å to about 20 Å, by heating the substrate surface with a shaped, continuous wave laser light beam to uniformly heat an annular zone between the crystallization temperature and the melting temperature. Recrystallization of the surface layer results in the formation of microcrystals exhibiting a uniform controllable roughness enabling a ultra-low flying height, e.g., a glide height of about 0.2 to about 0.5 $\mu$-in. Advantageously, the use of a shaped, continuous wave laser light beam provides uniform heating thereby reducing stress and corrosion. Magnetic recording medium in accordance with the present invention having a continuous textured layer landing zone with a controllable roughness enables ultra-low flying height applications and a low wear rate. The methodology in accordance with embodiments of the present invention is highly efficient and enables texturing a disk within a few seconds at a laser power of about 100 watts.

Magnetic recording media in accordance with various embodiments of the present invention comprise laser textured substrates having sequentially applied layers on opposing surfaces thereof, such as a seedlayer, an underlayer, a magnetic layer, a protective overcoat, e.g., a carbon-containing protective overcoat, and a lubricant topcoat. The seedlayer, underlayer, magnetic layer and protective overcoat can be applied by conventional sputtering techniques, deposited in conventional thicknesses employed in the production of magnetic recording medium.

The present invention can be employed to produce any of various types of magnetic recording media including thin film disks, with an attendant improvement in flying stability, glide performance and head-medium interface reliability. Magnetic recording media in accordance with the present invention exhibit increased areal recording density and enable reduction in the size of head sliders.

Only the preferred embodiment of the present invention and the few examples of its versatility are shown and described in the present disclosure. It is to be understood that the present invention is capable of use in various other combinations and environments and is capable of changes or modifications within the scope of the inventive concept as expressed herein.

What is claimed is:

1. A method of manufacturing a magnetic recording medium, the method comprising:

rotating a glass-ceramic substrate; and impinging a shaped continuous wave rectangular laser light beam having a flat top intensity profile on a surface of the rotating substrate to uniformly heat an annular zone to increase surface roughness.

2. The method according to claim 1, comprising heating the zone to a temperature between the crystallization temperature and melting temperature of the glass-ceramic substrate.

3. The method according to claim 2, comprising air cooling to induce the surface roughness comprising recrystallized microcrystals.

4. The method according to claim 1, comprising heating and air cooling to form an annular landing zone having an average surface roughness (Ra) of about 5 Å to about 30 Å.

5. The method according to claims 4, comprising forming the annular landing zone with an Ra of about 6 Å to about 20 Å.

6. The method according to claim 5, comprising forming the annular landing zone with an average roughness peak ($R_p$) of about 20 Å to about 120 Å.

7. The method according to claim 5, wherein the magnetic recording medium is suitable for use with a transducer head at a glide height of about 0.2 to about 0.5 $\mu$-in.

8. The method according to claim 5, wherein the magnetic recording medium is suitable for use with a transducer head at a glide height of about 0.3 $\mu$-in or less.

9. The method according to claim 1, comprising impinging the laser light beam at a beam diameter of about 10 to about 30 microns on the substrate surface.

10. A method of manufacturing a magnetic recording medium, the method comprising:

rotating a glass-ceramic substrate; and impinging a defocused continuous wave laser light beam on a surface of the rotating substrate, such that the impinging laser light beam forms a spot size on the surface having a diameter of about 40 microns to about 50 microns and substantially uniformly heats an annular zone to increase surface roughness.

11. The method according to claim 10, comprising:

heating the zone to a temperature between the crystallization temperature and melting temperature of the glass-ceramic substrate; and air cooling to induce the surface roughness comprising recrystallized microcrystals.

12. The method according to claim 11, comprising heating and air cooling to form an annular landing zone having an average surface roughness (Ra) of about 6 Å to about 20 Å.

* * * * *